United States Patent [19]

Camlibel et al.

[11] 4,119,363
[45] Oct. 10, 1978

[54] PACKAGE FOR OPTICAL DEVICES INCLUDING OPTICAL FIBER-TO-METAL HERMETIC SEAL

[75] Inventors: Irfan Camlibel, Stirling; Theodore Charles Rich, Branchburg, both of N.J.

[73] Assignee: Bell Telephone Laboratories Incorporated, Murray Hill, N.J.

[21] Appl. No.: 667,961

[22] Filed: Mar. 18, 1976

[51] Int. Cl.$^2$ .......................... G02B 5/14; H01L 33/00
[52] U.S. Cl. ...................................... 350/96.20; 357/17; 250/552
[58] Field of Search ....................... 250/552; 357/17, 19; 174/74 R, 75 R, 77 R; 264/271; 65/59 R, 154; 350/67, 96 G, 96 R; 228/122, 132, 903

[56] References Cited

U.S. PATENT DOCUMENTS

| | | | |
|---|---|---|---|
| 2,312,579 | 3/1943 | O'Brien | 228/132 |
| 2,640,901 | 6/1953 | Kinman | 357/74 |
| 2,728,425 | 12/1955 | Day | 228/122 |
| 3,837,688 | 9/1974 | Vollbehr | 228/132 |
| 3,840,889 | 10/1974 | O'Brien et al. | 357/81 |
| 3,861,781 | 1/1975 | Hasegawa et al. | 350/96 C |
| 3,932,761 | 1/1976 | Ramsey | 250/552 |
| 4,003,074 | 1/1977 | Yonezu et al. | 357/19 X |

OTHER PUBLICATIONS

A. A. Manko, "Solders and Soldering" (New York: McGraw-Hill Book Co., 1964), pp. 286–289.
N.F. Lashko and S.V. Lashko-Avakyan, "Brazing and Soldering of Metals" (Jerusalem: Israel Program for Scientific Trans.) 1961, pp. 401–410.
A. L. Jenny, "Soldered Ceramic-to-Metal Seals", Product Eng. vol. 18, No. 12, pp. 154–157, 1947.
H. G. Vogt "Metailized Glass . . . "Materials and Methods vol. 25 No. 6, pp. 81–86, 1947.
Kyle, T.R., "Glass Fiber Hermetic Seals using a $CO_2$ Laser" Applied Optics, vol. 14, No. 6, June 1975 pp. 1342–1344.
J. Guttmann, O. Krumpholz, E. Pfeiffer "Optical Fiber-Stripline-Coupler" Applied Optics vol. 14, No. 5, May, 1975, pp. 1225–1227.

*Primary Examiner*—John K. Corbin
*Assistant Examiner*—Rolf Hille
*Attorney, Agent, or Firm*—Michael J. Urbano

[57] ABSTRACT

An optical fiber is hermetically sealed to a metal housing containing an optical device (e.g., a semiconductor junction laser or photodiode) by threading and centering the fiber through a thin walled metal tube, filling the tube with solder (e.g., a cylindrical preform) and allowing it to cool. The solder, upon solidifying and cooling, squeezes against the fiber and forms a hermetic seal. The tube-fiber assembly is inserted through an aperture in the housing wall, the fiber is aligned with the optical device and then the tube is soldered to the wall. The housing is out-gassed and then back-filled with a non-corrosive ambient such as nitrogen. Other aspects of the hermetic package, including a laser mount, are also described.

15 Claims, 2 Drawing Figures

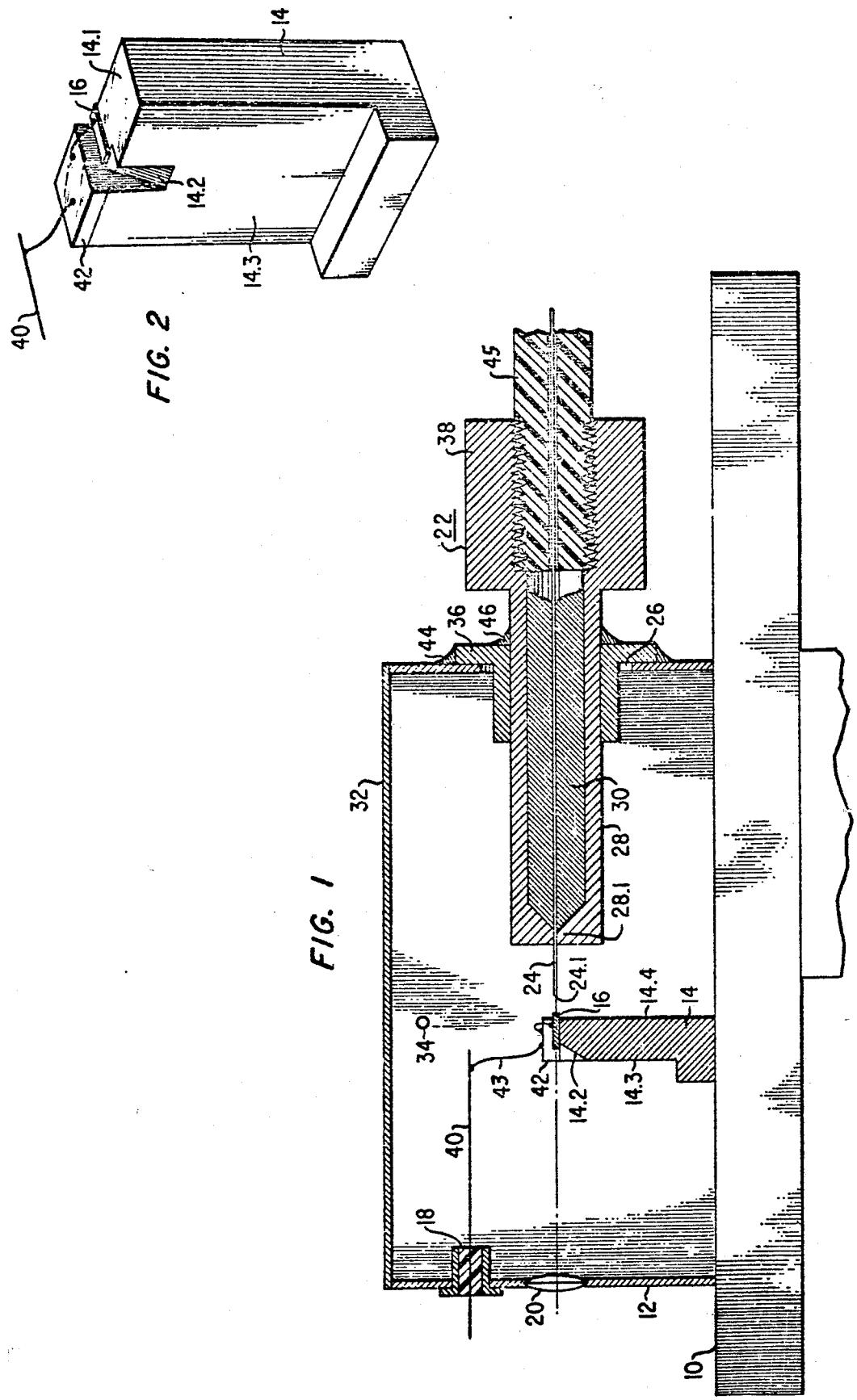

PACKAGE FOR OPTICAL DEVICES INCLUDING OPTICAL FIBER-TO-METAL HERMETIC SEAL

BACKGROUND OF THE INVENTION

This invention relates to packaging optical devices and, more particularly, to hermetically sealing an optical fiber to a metal housing containing a semiconductor junction laser or photodiode.

From the recent development of optical communications a need has emerged for special devices and piece-parts particular to this technology. In particular, optical systems as presently contemplated will contain active optical sources and detectors, both of which are expected to require a hermetic housing to protect the optical devices from attack by deleterious contaminants in the ambient, such as moisture in the atmosphere. Inasmuch as optical signals exit or enter the hermetic housing via optical fibers, some means to hermetically seal the fiber to the housing will be required. For most applications a satisfactory seal should be inexpensive and reliable, and the optical fiber should undergo no significant change in optical or mechanical properties due to the construction of the seal.

SUMMARY OF THE INVENTION

We have developed an optical fiber-to-metal seal which meets all of the above requirements and which in addition is relatively simple to construct. In accordance with one embodiment of the invention, the seal is made by threading and centering a bare optical fiber through a metal tube, filling the annular space between the tube and the fiber with solder (e.g., a cylindrical preform) heating the solder to a molten state, and allowing it to cool. The solder, upon solidifying and cooling squeezes against the fiber and forms a hermetic seal. The package is completed by inserting the tube-fiber assembly through an aperture in a wall of the housing containing an optical device. The fiber is aligned with respect to the optical device, and then the tube is soldered or otherwise secured to the wall. The housing is out-gassed and then back-filled with a noncorrosive ambient such as nitrogen.

BRIEF DESCRIPTION OF THE DRAWING

Our invention, together with its various features and advantages, can be readily understood from the following more detailed description taken in conjunction with the accompanying drawing, in which:

FIG. 1 is a cross-sectional view of a laser package including an optical fiber-to-metal hermetic seal in accordance with one embodiment of our invention, and FIG. 2 is an enlarged pictorial view of the laser mount shown in FIG. 1.

DETAILED DESCRIPTION

Turning now to FIG. 1, there is shown a laser package comprising a header 10, a housing 12 mounted on the header, a mount 14 mounted on the header and within the housing, a semiconductor junction laser 16 secured to mount 14, lead-through conductor means 13 for supplying electrical power to laser 16, a lens 20 mounted in a wall of housing 12 to permit monitoring of the laser radiation, and an optical fiber-to-metal hermetic seal 22 mounted in an aperture 26 in another wall of housing 12 so that optical fiber 24 is aligned with respect to an output face of laser 16.

In accordance with one aspect of the invention, the hermetic seal 22 is made before the seal is mounted in aperture 26. That is, bare optical fiber 24 is threaded and centered through metal tube 28 and a cylindrical, narrow bore solder preform 30. The preform 30 is heated to a molten state and then allowed to cool. The solder upon solidifying and cooling squeezes against the fiber and forms a hermetic seal. Note that tube 28 optionally has a neck 28.1 at its interior end designed to confine the solder and to aid in centering the fiber in the tube. The tube-fiber assembly (that is, the seal 22) is inserted through aperture 26, the fiber 24 is aligned with respect to the output face of laser 16 and then the tube 28 is soldered to the housing wall. The housing is out-gassed and then back-filled with a noncorrosive ambient.

The laser package and its fabrication procedure will now be described in greater detail in accordance with an embodiment of the invention actually constructed. The header 10 was made of electrolytic tough-pitch copper. The housing 12, which was rectangular in shape, was made of Kovar strips butt-welded at adjoining edges. Initially lid 32 is off housing 12 in order to permit access to the interior of the housing. Openings to accommodate lens 20 (a glass whose thermal expansion coefficient closely matched that of the housing walls) and electrical feed-through 18 (a commercially available gold-plated piecepart) were drilled through one wall of the housing and aperture 26 was drilled through the opposite wall. The lens 20 collected light emitted from the back face of laser 16 and passed it to a photodiode (not shown) outside the housing 12. The photodiode monitored the laser output and, in conjunction with feedback circuitry, stabilized the laser intensity.

A pinch-off tube (not shown) made of thin-walled Rodar tubing was soldered to a small aperture 34 in housing 12 in order to permit out-gassing and back-filling of the housing.

A ferrule 36 made of hard copper was used to cover the opening between the hermetic seal 22 and the housing wall. The ferrule 36 and aperture 26 were designed to permit a small amount of movement of the ferrule so that the optical fiber 24 could be aligned with respect to laser 16. As shown in FIG. 1, the flange of the ferrule 36 was located exterior to the housing 12. However, it is readily apparent that the ferrule could be reversed.

The tube 28 of seal 22 was provided at its exterior end with an internally threaded boss member 38. A loose fitting teflon jacket 45 of an optical fiber pigtail assembly was threaded into boss 38. A half-connector (not shown) was mounted at the other end of the pigtail assembly to permit coupling to a mating half-connector at one end of a transmission optical fiber.

The procedure for assembling the laser package will now be described. Because various soldering operations are used at successive stages, the solders were carefully selected both for their physical characteristics and melting points so as not to disrupt parts already assembled. Therefore, during assembly earlier steps generally utilized higher temperature solders and later steps utilized lower temperature solders compatible with reliability.

After drilling the required holes in the housing walls, a glass window was fused into the housing opening with an oxy-hydrogen torch at 900° C. to form lens 20. The focal length of the lens, of the double-convex type, was approximately equal to the distance from the lens to the nearest (rear) laser mirror. Consequently, the laser beam which was transmitted through the lens 20 was fairly well collimated for a distance of about 5 cm from the housing.

Next, the housing 12 was soldered to header 10 using a silver solder preform (in the shape of a rectangular frame) and commercially available flux. The parts were uniformly heated to approximately 700° C. in a dry nitrogen atmosphere. During this step the pinch-off tube was also silver-soldered to the housing at aperture 34. This subassembly was then nickel-flashed and gold-plated to a thickness of about 100 microinches.

The electrical feedthrough 18 was then soldered in the opening provided in housing 12 using 60% Sn—40% Pb solder (melting point about 180° C.) at a temperature of about 210° C. Next, the mount 14 was indium-bonded at 170° C. onto header 10 inside the housing 12. Because of the high melting point eutectic formed during the bonding of the laser 16 to the mount 14, as discussed below, the bonding of the mount to the header does not adversely affect the bond between the laser and mount.

The mount 14, an L-shaped, gold-plated copper block, was indium bonded to the gold contact (p-side contact) of laser 16 forming an In-Au eutectic of much higher melting point than that of indium. The melting point of indium is about 156° C. The laser 16 was a GaAs-AlGaAs double heterostructure junction laser of the type described by I. Hayashi in U.S. Pat. No. 3,578,875 issued on Sept. 11, 1973. As shown in FIG. 2, the mount 14 included a horizontal top surface 14.1 and an oblique beveled surface 14.2 extending between top surface 14.1 and a rearward vertical surface 14.3. Laser 16 was mounted on top surface 14.1 so that one mirror overhung beveled surface 14.2 and the opposite mirror overhung forward vertical surface 14.4. This positioning of the laser, which typically has a large divergence angle optical output, prevented large portions of the output light from being reflected off top surface 14.1 and hence away from lens 20 to the rear and fiber 24 to the front. To this end, the rear mirror of laser 16 is preferably placed a focal length away from lens 20, and the end 24.1 of fiber 24 is formed in the shape of a lens, to enhance the collection of light emanating from the mirrors of the laser.

In addition, a laser pad 42 comprising an electrically insulative material, such as BeO, was mounted on top surface 14.1 of mount 14. The top surface of the BeO was gold-plated to permit electrical connection between leadthrough conductor 40 and the p-side contact of laser 16 as described hereinafter. The electrical feedthrough conductor 40 and the laser pad 42 were then electrically connected together using a gold wire 43.

At this stage, the performance of the laser was evaluated by measuring the light output versus laser current under normal operating conditions and determining whether there were any oscillations in the light output of the laser. The packages which met the criteria set for laser performance were then ready for the final packaging steps; that is, aligning the fiber 24 to the laser 16 and soldering the seal 22 in place, sealing the housing lid and sealing the pinch-off tube after back-filling the housing with dry nitrogen gas to atmospheric pressure.

Aligning the fiber and soldering the hermetic seal will be described first. Maximum coupling of the laser radiation into the fiber 24 requires that the fiber lens 24.1 be carefully aligned in front of the laser junction and fixed in that position. Once fixed, the fiber should not be able to move typically any more than a few micrometers in a plane parallel to the laser output face and about 25 μm along an axis perpendicular thereto. Because the laser should not be operated at elevated temperature, the aligning operation was performed at ambient temperatures. Therefore, the soldering of the seal 22 into the housing 12 after the fiber 24 had been aligned at room temperature entailed the use of special procedures. First, any device used to hold and align the seal 22 should not be at a temperature much different from the laser subassembly (i.e., laser 16 and mount 14) which is held at 135° C., the flowing temperature of the solder preforms 44 and 46 (50% In—50% Sn; melting point about 120° C.) used to secure the seal to the housing. Any temperature difference leads to a difference in expansion and therefore to a change in position from the original fiber location. Second, the thermal expansion coefficients of the laser subassembly and the material from which the alignment fixture is made should be reasonably close to one another in order to minimize undesirable changes in dimensions and therefore changes in fiber position with temperature. Accordingly, the alignment device we used consisted of a double-hinged and spring-loaded holder that could be adjusted to move the seal 22 in two dimensions. It was made of brass because brass is easy to machine and has a thermal expansion of coefficient close to that of copper from which the bulk of the laser subassembly (i.e., the mount 14) is made.

The alignment device was loosely attached to a heating stage on which the laser subassembly was also mounted. The seal 22 (i.e., tube 28) was clamped in the alignment device and the two were positioned and pushed forward toward the laser subassembly by inserting the tube 28 through the ferrule 36 which had already been placed in position in the aperture 26 of the housing 12. An external micropositioner jig was used to facilitate the positioning of the tube 28 and the fiber 24 along the laser radiation axis. The laser was turned on and the light output from the fiber 24 (actually the light output from the pigtail connector) was detected by a PIN photodiode and displayed on an oscilloscope. The tube 28 was moved in or out axially with the microposioner and vertically and horizontally with the alignment device until a maximum signal was obtained. The alignment device was fixed in this position with its fastening screws and the external micropositioner jig was disconnected without disturbing the alignment. The laser was then turned off, and the heater was turned on. The temperature of the assembly was raised to 135° C. and the ferrule 36, the tube 28 and the housing wall were all sealed together by annular solder preforms 44 and 46. These preforms comprised 50% Sn—50% In (melting point about 120° C.) and were predipped in a liquid flux consisting of a zinc-saturated solution of hydrochloric acid. The heater was turned off, and the assembly was allowed to cool to room temperature. The laser was turned on again, and the entire output from the pigtail was compared with the room temperature value obtained previously. Next, the alignment device was loosened, and the assembly was removed from the heating stage. Any flux residue was washed off with distilled and deionized water, rinsed with methanol, rerinsed with distilled and deionized water and gently blown dry with a microduster. The laser was re-evaluated, and the results were compared with those obtained previously.

Next the lid 32 was sealed to the housing 12 using a solder preform comprising 80% Au and 20% Sn having a melting point of 280° C. A parallel seam sealer was used in this operation. Because the seam sealer solders the lid by localized heating, the 280° temperature involved did not disrupt any of the previous low temperature solder bonds. Once the lid 32 had been sealed on the housing, the assembly was tested for hermeticity with a commercially available helium leak detector capable of indicating leaks as low as $6 \times 10^{-11}$ cm$^3$/sec air equivalent. To test for leaks the pinch-off tube attached to aperture 34 was connected to the leak detector. The housing was then evacuated and helium gas was sprayed around the housing. Any leakage of helium into the package through one or more of the many solder seals would be detected by the leak tester.

Packages that showed no leakage were filled with dry nitrogen at atmospheric pressure while remaining attached to the leak tester. The pinch-off tube was then welded or otherwise shut. A 60% Sn—40% Pb solder ball was formed on this cold weld joint for further protection. The completed packages were then ready for incorporation into an epoxy-filled transmitter package which included electronic drive circuits and feedback circuits for controlling the operation of the laser.

Several advantageous characteristics of our hermetic seal should be noted. The mismatch in thermal expansion coefficients between the solder 30 and the fiber 24 is advantageous because the resulting stresses in the glass fiber at the glass-metal interface upon cooling are all compressive and therefore inhibit crack growth in the glass fiber. Including the influence of the copper tube 28, the pressure exerted by the solder on the fiber can be calculated to be in excess of 11,000 psi. However, the solder will not support this pressure; it will quickly cold flow until the pressure is about 4,500 psi. This residual stress in the solder will release in time and could result in failure of the seal. However, we have performed simulated aging tests on the 60% Sn—40% Pb solder used. These tests indicated that stress relaxation at room temperature should not be a failure mechanism for the hermetic seals. In fact, none of the seals we tested failed at their respective test temperatures. In addition, we heated two of the seals to the melting temperature of the solder 30 and found that the seal remained hermetic until the solder 30 actually melted.

We also temperature tested three seals by heating them 100 times from −50° C. to +105° C. and observed no leaks with a tester capable of measuring leak rates as low as $10^{-10}$ cm$^2$/sec air equivalent. A seal is considered hermetic if the leak rate is about $10^{-8}$ cm$^3$/sec or less.

Signal transmission through the hermetic seal was tested and found to be unaffected. Pull tests indicated that the fiber was not weakened by the process of making the seal.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, although the foregoing illustrative embodiment described the packaging of a junction laser it is apparent, of course, that similar principles apply to packaging other optical sources (such as LEDs) as well as optical detectors (such as avalanche photodiodes) in which a hermetic seal is required to couple an optical fiber to an optical device contained within a housing.

Moreover, we have built hermetic seals as described above with several different fiber compositions including borosilicate clad-silica fibers and silica clad-germania doped silica core fibers. With each the results were substantially equivalent.

What is claimed is:

1. A hermetic seal comprising:
   a metal tube wherein one end of the tube has a neck portion forming a narrow diameter opening,
   a bare optical fiber extending axially through the tube and forming an annular space therebetween, the fiber being centered by the neck portion, and
   solder means filling the annular space between the tube and fiber and being confined by the neck portion.

2. The hermetic seal of claim 1 wherein the metal tube comprises copper and the solder means comprises approximately 60% Sn and 40% Pb.

3. The hermetic seal of claim 2 wherein the solder means is a narrow bore cylindrical preform and the fiber extends axially through the bore, and
   the preform upon being heated melts and upon subsequently being cooled squeezes against the fiber and forms a hermetic seal.

4. The hermetic seal of claim 1 wherein the fiber is surrounded by a loosely fitting jacket which is threaded at one end, and the other end of the tube has an internally threaded boss adapted to receive the threaded end of the jacket.

5. A package for an optical device comprising:
   a metal header,
   a metal housing mounted on the header and having an opening in a wall thereof,
   an optical device mounted on the header and within the housing,
   a metal tube extending through the opening and sealed to the housing, the metal tube having a narrow diameter neck portion,
   a bare optical fiber extending axially through the tube so that the end of the fiber inside the housing is aligned with respect to the optical device, the neck portion centering the fiber within the tube, and
   solder means filling the annular space between the tube and the fiber and being confined by the neck portion.

6. The package of claim 5 including a ferrule inserted in the opening and sealed to the housing, the tube being inserted in the ferrule and sealed thereto.

7. The package of claim 5 wherein the optical device comprises a semiconductor p-n junction laser having a pair of mirrors to permit egress of radiation therefrom and a pair of electrical contacts for forward-biasing the p-n junction, and including
   a window in a wall of the housing to permit egress of a portion of the laser radiation for monitoring the laser operation.

8. The package of claim 7 wherein the window is a lens positioned at a focal length from the nearest laser mirror.

9. A method of fabricating a hermetic seal for an optical fiber comprising the steps of:
   (a) inserting the bare fiber axially through a metal tube which has a narrow diameter neck portion,
   (b) centering the fiber by means of the neck portion,
   (c) filling the annular space between the tube and the fiber with a solder preform,
   (d) heating the solder preform until it melts, the solder being confined by the neck portion, and (e) allowing the solder to cool until it solidifies.

10. The method of claim 9 wherein in step (b) the annular space is filled with a solder preform comprising approximately 60% Sn and 40% Pb.

11. A method of fabricating a package containing an optical device comprising the steps of:
 (a) mounting the walls of a metal housing on a metal header, the top of the housing being initially open to permit access to the interior thereof,
 (b) mounting an optical device on the header and within the housing,
 (c) inserting a hermetic seal fabricated according to claim 9 through the opening in the housing wall,
 (d) aligning the optical fiber of the hermetic seal with respect to the optical device,
 (e) sealing the tube of the hermetic seal to the housing,
 (f) sealing a lid to the top of the housing,
 (g) evacuating the housing, and
 (h) filling the housing with a non-corrosive gas.

12. The method of claim 11 wherein the optical device is a semiconductor p-n junction laser, and including prior to step (f) the additional step of forming a glass window in a wall of the housing to permit egress of a part of the laser radiation for monitoring the laser operation.

13. The method of claim 12 wherein the glass window is fused into an aperture in the housing wall thereby forming a double convex lens having a focal length approximately equal to the distance between the lens and the nearest laser mirror.

14. The method of claim 11 wherein mounting steps (a) and (b) and sealing step (e) each include a soldering step and wherein earlier soldering steps use higher melting point solders than later steps.

15. The method of claim 11 wherein in step (h) the housing is filled with dry nitrogen to atmospheric pressure.